US010592258B2

(12) United States Patent
Krzeminski et al.

(10) Patent No.: US 10,592,258 B2
(45) Date of Patent: Mar. 17, 2020

(54) SYSTEMS AND METHODS FOR LOADING FEATURES

(71) Applicant: Facebook, Inc., Menlo Park, CA (US)

(72) Inventors: Julian Krzeminski, New York, NY (US); Cheng Huang, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 15/809,861

(22) Filed: Nov. 10, 2017

(65) Prior Publication Data

US 2019/0012185 A1    Jan. 10, 2019

Related U.S. Application Data

(60) Provisional application No. 62/530,079, filed on Jul. 7, 2017.

(51) Int. Cl.
*G06F 9/445* (2018.01)
*G06F 8/65* (2018.01)

(52) U.S. Cl.
CPC .............. *G06F 9/4451* (2013.01); *G06F 8/65* (2013.01); *G06F 9/44521* (2013.01)

(58) Field of Classification Search
CPC ... G06F 8/60; G06F 8/65; G06F 9/445; G06F 9/44521; G06F 9/4451
USPC .................................................. 717/165–178
See application file for complete search history.

(56) References Cited

U.S. PATENT DOCUMENTS

| | | | | |
|---|---|---|---|---|
| 6,718,373 B1* | 4/2004 | Bearden | ................... | G06F 8/61 |
| | | | | 709/220 |
| 9,443,204 B2* | 9/2016 | Vasseur | ............... | H04L 67/1029 |
| 9,465,604 B1* | 10/2016 | Burgyan | ................... | G06F 8/65 |
| 9,806,933 B2* | 10/2017 | Bhakar | ................... | H04L 29/06 |
| 9,824,094 B1* | 11/2017 | Meyer | ..................... | H04L 67/06 |
| 10,114,836 B1* | 10/2018 | Meyer | ..................... | H04L 67/06 |
| 10,216,505 B2* | 2/2019 | Doar | ........................ | G06F 8/61 |
| 2007/0067309 A1* | 3/2007 | Klein, Jr. | .......... | G06F 17/30017 |
| 2008/0016214 A1* | 1/2008 | Galluzzo | ............... | H04L 67/322 |
| | | | | 709/226 |
| 2010/0162231 A1* | 6/2010 | Lanchares | ................. | G06F 8/60 |
| | | | | 717/177 |
| 2010/0313002 A1 | 12/2010 | Hamid | | |
| 2012/0096433 A1 | 4/2012 | Reinhold | | |
| 2013/0073600 A1* | 3/2013 | Jenkins | ................. | G06F 9/5027 |
| | | | | 709/201 |

(Continued)

OTHER PUBLICATIONS

International Application No. PCT/US2017/061320, International Search Report and Written Opinion dated Apr. 4, 2018.

(Continued)

*Primary Examiner* — Marina Lee
(74) *Attorney, Agent, or Firm* — Sheppard Mullin Richter & Hampton LLP

(57) ABSTRACT

Systems, methods, and non-transitory computer-readable media can determine a set of feature components corresponding to a software application, wherein each feature component corresponds to a modularized feature provided by the software application. An order for loading the set of feature components upon execution of the software application can be determined. The set of feature components can be loaded in memory based at least in part on the determined order.

14 Claims, 9 Drawing Sheets

(56) References Cited

U.S. PATENT DOCUMENTS

| | | | | |
|---|---|---|---|---|
| 2013/0073601 A1* | 3/2013 | Jenkins | .................... | G06F 9/547 709/201 |
| 2013/0117359 A1* | 5/2013 | Husain | .................... | H04L 67/34 709/203 |
| 2013/0232540 A1* | 9/2013 | Saidi | .................... | G06F 21/6218 726/1 |
| 2014/0053116 A1* | 2/2014 | Smith | .................... | G06F 3/0488 715/863 |
| 2014/0280573 A1 | 9/2014 | Bhakar | | |
| 2014/0280574 A1* | 9/2014 | Bhakar | .................... | H04L 29/06 709/204 |
| 2014/0310395 A1* | 10/2014 | Chakra | .................... | H04L 67/22 709/224 |
| 2014/0358983 A1* | 12/2014 | Dalmau | .................... | H04L 67/10 709/201 |
| 2015/0281111 A1* | 10/2015 | Carl | .................... | H04L 47/70 709/226 |
| 2017/0032386 A1* | 2/2017 | Borza | .................... | G06N 20/00 |
| 2017/0237682 A1* | 8/2017 | Xue | .................... | G06F 9/5038 709/226 |
| 2018/0060052 A1* | 3/2018 | Doar | .................... | G06F 8/61 |
| 2019/0012185 A1* | 1/2019 | Krzeminski | .......... | G06F 9/4451 |

OTHER PUBLICATIONS

European Patent Application No. 18171827.1, Search Report dated Dec. 7, 2018.

Kaegi, Simon Richard et al., "Modular Java Web Applications," Proceedings of the 2008 ACM Symposium on Applied Computing (SAC '08), pp. 688-693, Mar. 16, 2008.

Kramer, Dean et al., "An Extensible, Self Contained, Layered Approach to Context Acquisition," Proceedings of the Third International Workshop on Middleware for Pervasive Mobile and Embedded Computing (M-MPAC 11), Article No. 6, Dec. 12, 2011.

Kriz, Pavel et al., "Provisioning of Application Modules to Android Devices," 25th International Conference Radioelektronika, Apr. 21, 2015.

Maly, Filip et al., "Techniques for Dynamic Deployment of Modules in Context-Aware Android Applications," 16th IEEE International Symposium on Computational Intelligence and Informatics (CINTI), pp. 107-111, Nov. 19, 2015.

Zhong, Junjie et al., "Research on Intelligent Dynamic Loading Mechanism of Mobile Applications," 16th International Symposium on Communications and Information Technologies (ISCIT), pp. 681-685, Sep. 26, 2016.

* cited by examiner

500

```
┌─────────────────────────────────────────────────┐
│ Determine a set of feature components corresponding │
│ to a software application, wherein each feature component │
│ corresponds to a modularized feature provided by │
│             the software application             │
│                      502                         │
└─────────────────────────────────────────────────┘
                        │
                        ▼
┌─────────────────────────────────────────────────┐
│ Determine an order for loading the set of feature components upon │
│         execution of the software application    │
│                      504                         │
└─────────────────────────────────────────────────┘
                        │
                        ▼
┌─────────────────────────────────────────────────┐
│ Load the set of feature components into memory based at least in │
│            part on the determined order          │
│                      506                         │
└─────────────────────────────────────────────────┘
```

FIGURE 5

SYSTEMS AND METHODS FOR LOADING FEATURES

CROSS-REFERENCE TO RELATED APPLICATIONS

This application claims priority to U.S. Provisional Patent Application No. 62/530,079, filed on Jul. 7, 2017 and entitled "SYSTEMS AND METHODS FOR LOADING FEATURES", which is incorporated in its entirety herein by reference.

FIELD OF THE INVENTION

The present technology relates to the field of feature loading. More particularly, the present technology relates to techniques for loading features of an application.

BACKGROUND

Users often utilize computing devices for a wide variety of purposes. Users can use their computing devices to, for example, interact with one another, access media content, share media content, and create media content. In general, such functionality can be provided through software applications that run on computing devices.

SUMMARY

Various embodiments of the present disclosure can include systems, methods, and non-transitory computer readable media configured to determine a set of feature components corresponding to a software application, wherein each feature component corresponds to a modularized feature provided by the software application. An order for loading the set of feature components upon execution of the software application can be determined. The set of feature components can be loaded in memory based at least in part on the determined order.

In some embodiments, the systems, methods, and non-transitory computer readable media configured to perform assigning each feature component to a tier in a set of tiers, wherein each tier is associated with a respective load order.

In some embodiments, each feature component is assigned to a tier based at least in part on its load priority.

In some embodiments, the load priority is determined based at least in part on historical user interaction data for a feature corresponding to the feature component.

In some embodiments, the systems, methods, and non-transitory computer readable media configured to perform determining a set of attributes describing a user operating the computing device and assigning a respective load order to each feature component based at least in part on the set of attributes.

In some embodiments, the systems, methods, and non-transitory computer readable media configured to perform determining a geographic region associated with a user operating the computing device and assigning a respective load order to each feature component based at least in part on the geographic region.

In some embodiments, the systems, methods, and non-transitory computer readable media configured to perform determining a personalized load order for a user operating the computing device, the personalized load order being determined based at least in part on the user's historical interaction with features provided by the software application.

In some embodiments, each feature component is associated with a corresponding custom class loader.

In some embodiments, the custom class loader is implemented using DexClassLoader.

In some embodiments, each feature component corresponds to a respective Dalvik Executable (dex) file.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method, according to an embodiment of the present disclosure.

Figure 1:
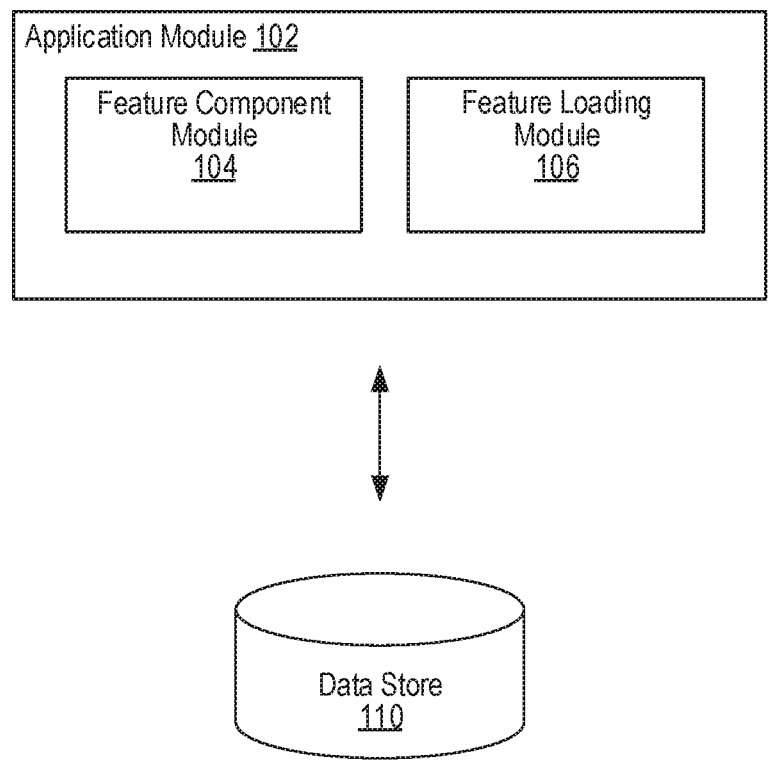
FIG. 1 illustrates an example system including an application module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Loading Application Features

Users often utilize computing devices for a wide variety of purposes. Users can use their computing devices to, for example, interact with one another, access media content, share media content, and create media content. In general, such functionality can be provided through software applications that run on computing devices. Under conventional approaches, a software application can be created and stored as one or more executable files. When the software application is executed on a computing device, the computing device can load and execute the executable files corresponding to the software application in their entirety. These conventional approaches can unnecessarily initialize and load certain application features which may not be needed by a user accessing the software application. As a result, the software application may not operate as intended. For example, the software application may stall or lag during execution on outdated computing devices. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. For example, a set of feature components corresponding to a software application can be determined. Each feature component can correspond to a modularized feature provided by the software application. An order for loading the set of feature components upon execution of the software application can be determined. The set of feature components can be loaded in memory based at least in part on the determined order. In general, this modularizing of features into individual feature components that can be eager or lazy loaded provides a number of advantages. For instance, modularizing features from a main component (e.g., main dex file) of a software application can decrease the number of methods that are included in the main component. This decrease can be advantageous if there is a limit to the number of methods that can be included in the main component. For instance, there may be a predefined limit to the number of methods that can be referenced in a dex file. In another example, lazy loading features as individual feature components can permit a faster cold start of the software application. In this example, the individual feature components can be loaded as needed, if at all. In yet another example, by compartmentalizing features into feature components, a software application can be distributed without having to include code corresponding to all of the available features. In this example, individual feature components corresponding to various features can be obtained (e.g., downloaded) at a later time if needed. More details relating to the disclosed technology are provided below.

FIG. 1 illustrates an example system 100 including an application module 102, according to an embodiment of the present disclosure. As shown in the example of FIG. 1, the application module 102 can include a feature component module 104 and a feature loading module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the application module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the application module 102 can be implemented, in part or in whole, as software running on one or more computing devices or systems, such as on a user or client computing device. In one example, the application module 102 or at least a portion thereof can be implemented as or within an application (e.g., app), a program, or an applet, etc., running on a user computing device or a client computing system, such as the user device 610 of FIG. 6. In another example, the application module 102 or at least a portion thereof can be implemented using one or more computing devices or systems that include one or more servers, such as network servers or cloud servers. In some instances, the application module 102 can, in part or in whole, be implemented within or configured to operate in conjunction with a social networking system (or service), such as the social networking system 630 of FIG. 6.

The application module 102 can be configured to communicate and/or operate with the at least one data store 110, as shown in the example system 100. The at least one data store 110 can be configured to store and maintain various types of data. For example, the data store 110 can store information describing various application features that have been modularized into a set of individual feature components. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data.

The feature component module 104 can be configured to manage modularized features of a software application. In some embodiments, features included in a software application can be modularized into respective feature components. In such embodiments, any software code corresponding to a given feature can be executed (or called) using its corresponding feature component. For example, a software application may be created as one main component that can be loaded by a computing device upon execution. Under the Android™ runtime environment, this main component may correspond to a main Dalvik Executable ("dex") file. In this example, this main dex file may include all of the code that is needed to provide the various features of the software application. In some embodiments, code corresponding to some, or all, of these features can be modularized into separate feature components that are isolated from the main component of the software application. For example, under the Android™ runtime environment, each separate feature component may correspond to an individual dex file. In various embodiments, when the software application is launched, the main component can be executed to load a pared down version of the software application into memory. In such embodiments, the modularized feature components can then be loaded into memory based on some determined load order or as needed. In some embodiments, after separating a feature from the main component, all aspects of that feature are provided through a single interface (e.g., application programming interface). This interface is then used to call or otherwise interact with methods included in a feature component corresponding to that feature. In such embodiments, the dex file for the feature includes software code corresponding to the feature (e.g., code that was originally included in the main dex file) along with all of that feature's exclusive dependencies. In some embodiments, any shared dependencies (e.g., dependencies shared with the main component) can still be included in the main dex file. In general, any well-known approach may be used to generate individual feature components (e.g., individual dex files) including, for example, the Buck build system. The examples provided reference Dalvik Executable ("dex") files for convenience. However, the approaches described herein may be adapted to operate using any type of file.

In various embodiments, the feature loading module 106 can load modularized feature components of a software application separately from a main component corresponding to the software application. For example, the feature loading module 106 can load a feature component (e.g., dex file) corresponding to a given feature of a software application while the software application is running on a computing device. In some embodiments, certain feature components may be lazy loaded. In some embodiments, certain feature components may be eager loaded. Additional details regarding the feature loading module 106 are provided below with reference to FIG. 2.

Figure 2:
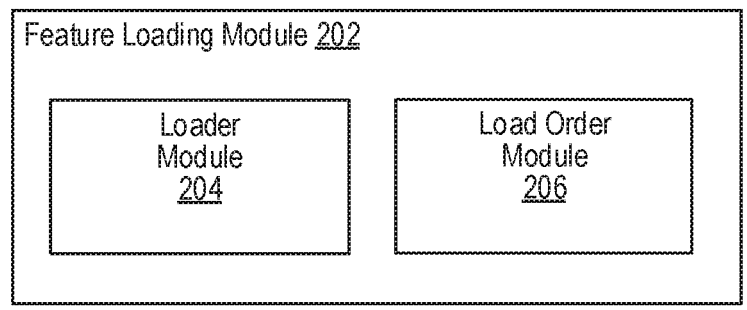
FIG. 2 illustrates an example feature loading module, according to an embodiment of the present disclosure.

FIG. 2 illustrates a feature loading module 202, according to an embodiment of the present disclosure. In some embodiments, the feature loading module 106 of FIG. 1 can be implemented with the feature loading module 202. As shown in the example of FIG. 2, the feature loading module 202 can include a loader module 204 and a load order module 206.

The loader module 204 can be configured to load feature components corresponding to a software application. In some embodiments, the loader module 204 loads feature components in a Java™ virtual machine (JVM) environment using the Java™ class loading mechanism.

Figure 4A:
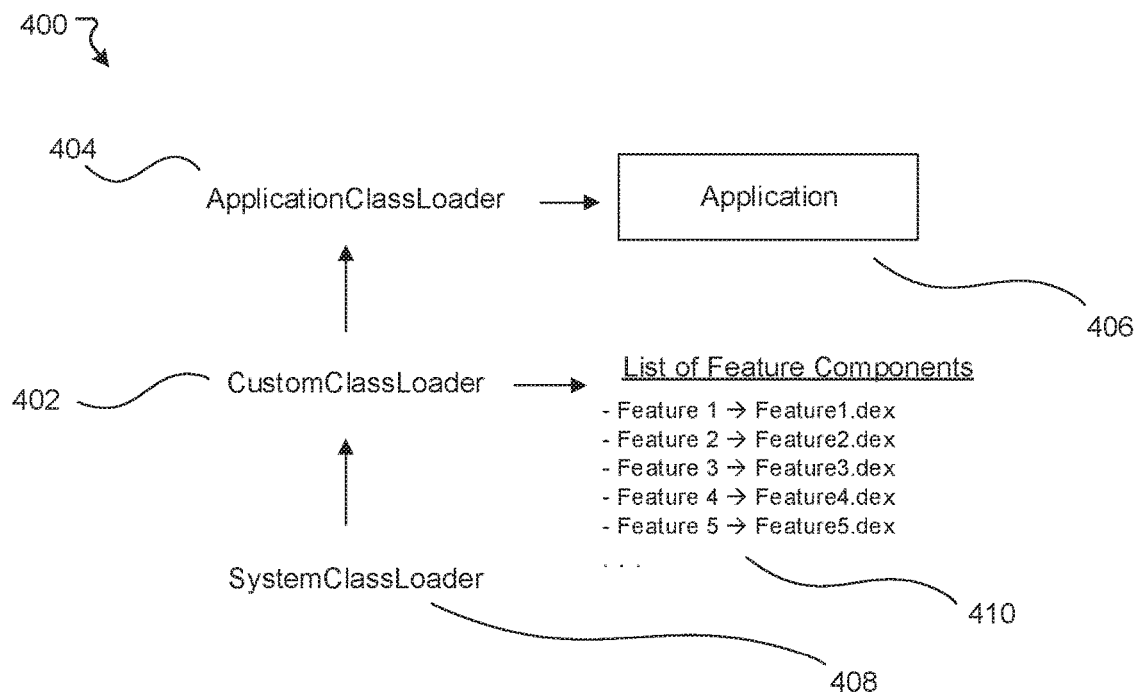
FIGS. 4A-4E illustrate example diagrams, according to an embodiment of the present disclosure.

In one embodiment, the loader module 204 relies on an injected custom class loader to load feature components (e.g., dex files) into memory. For example, the custom class loader may be injected within a chain of class loaders that correspond to a software application. This chain of class loaders can include a class loader that references the software application (e.g., ApplicationClassLoader) and a default system class loader that references various frameworks and/or libraries (e.g., SystemClassLoader). In this example, the custom class loader can be injected between the class loader referencing the software application and the class loader referencing the default system class loader, as illustrated in the example of FIG. 4A. In this embodiment, the custom class loader can reference a list of feature components (e.g., dex files). When a given feature is called, for example, while the software application is running in a JVM, the chain of class loaders can be traversed to identify a feature component that services the called feature. In this example, the custom class loader can identify the feature component (or dex file) for the feature based on the list of feature components. The identified feature component can then be loaded into memory. Once loaded, the JVM can call the feature component to provide various functionality.

Figure 4B:
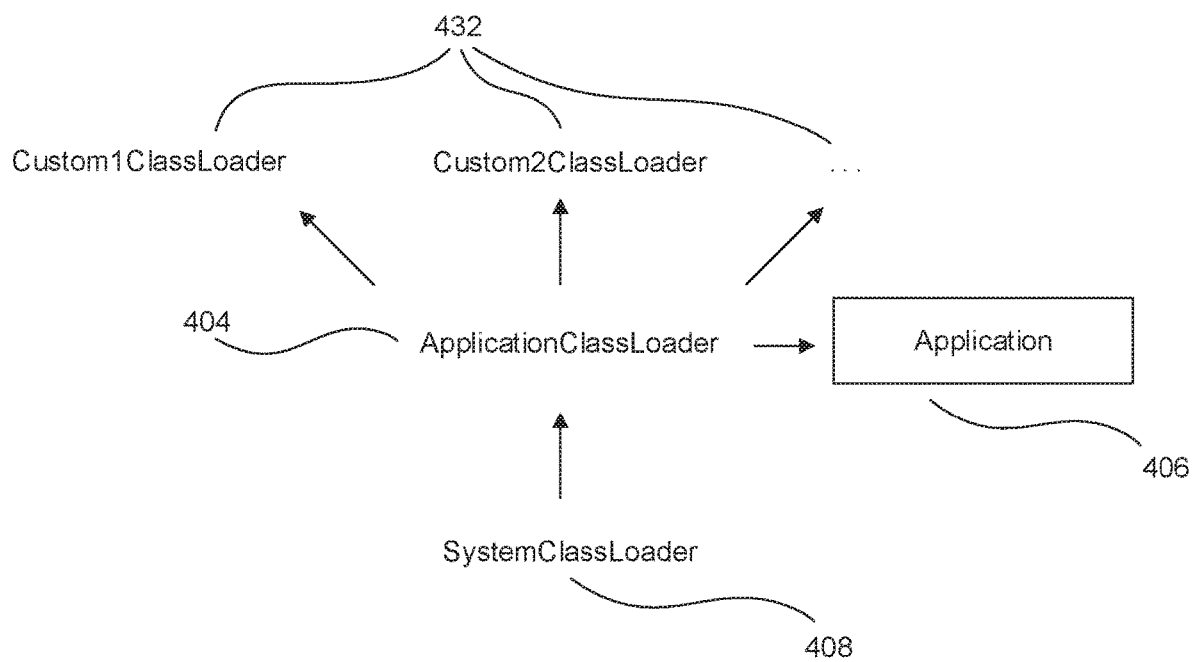

In another embodiment, the loader module 204 relies on individual custom class loaders to load feature components (e.g., dex files) into memory. For example, each custom class loader can reference a different feature component of a software application, as illustrated in the example of FIG. 4B. In this example, a custom class loader for a feature component can be used to execute code corresponding to the feature component without requiring this code to be installed with the software application. In some embodiments, a custom class loader can be implemented using DexClassLoader. In various embodiments, a delegate (or proxy class) may be implemented to permit custom class loading of a feature component that corresponds to a software application. For example, if a feature component corresponds to an activity (e.g., "MyFeatureActivity"), then a delegate for this activity (e.g., "MyFeature ActivityDelegate") can be created and inserted into a main component (e.g., main dex file) and a manifest corresponding to the software application. This delegate can act as a thin wrapper that delegates all calls to the activity to the feature component (e.g., dex file) that implements the activity.

The load order module 206 can be configured to determine an order in which feature components are loaded (or executed). This load order may be determined using various approaches. For example, in some embodiments, feature components of a software application can be loaded on-demand by a computing device when accessed by a user. Additional details regarding the load order module 206 are provided below with reference to FIG. 3.

Figure 3:
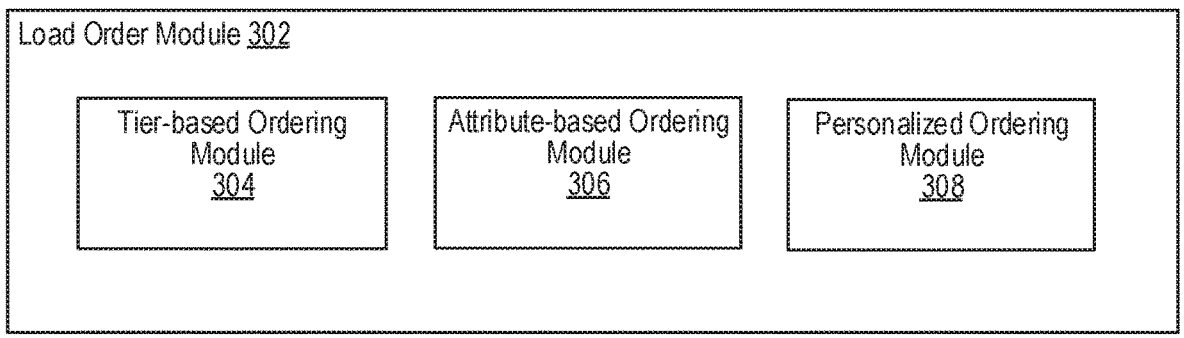
FIG. 3 illustrates an example load order module, according to an embodiment of the present disclosure.

FIG. 3 illustrates a load order module 302, according to an embodiment of the present disclosure. In some embodiments, the load order module 206 of FIG. 2 can be implemented with the load order module 302. As shown in the example of FIG. 3, the load order module 302 can include a tier-based ordering module 304, an attribute-based ordering module 306, and a personalized ordering module 308.

The tier-based ordering module 304 can be configured to categorize (or assign) feature components into a set of tiers. In some embodiments, each tier can be assigned some load order and/or load time. For example, feature components of a software application that were assigned to a first tier can be loaded when the software application is launched (e.g., on cold start). In this example, feature components assigned to a second tier can be loaded after the software application is fully launched (e.g., after cold start). Further, feature components assigned to a third tier can be loaded on-demand, for example, when accessed by a user or when called (e.g., by the software application or by some external process). In general, there may be any number of tiers and each tier may have its own assigned load order and/or load time.

In some embodiments, the tier-based ordering module 304 can assign feature components to a set of tiers based on pre-defined load priority. For example, in some embodiments, feature components of a software application can each be assigned a pre-defined load priority (e.g., A, B, C, etc.). Similarly, each tier in the set of tiers can be associated with a given load priority (e.g., A, B, C, etc.). In such embodiments, the tier-based ordering module 304 can assign each feature component to a tier that is consistent with that feature component's load priority. For example, a feature component that was assigned a load priority of "A" can be assigned to a tier that is associated with load priority "A". This assignment of feature components to tiers allows the feature components to be loaded in batches based on a load order and/or load time corresponding to their respective tiers.

In some embodiments, the tier-based ordering module 304 can determine a load priority for each feature component of a software application. In some embodiments, this load priority may be determined by evaluating historical user interaction data that describes user interactions with the software application in the aggregate. For example, the tier-based ordering module 304 can determine a load priority for a feature component based on when users, in the aggregate, utilize a feature corresponding to the feature component while accessing the software application. In some embodiments, the tier-based ordering module 304 may determine that a threshold amount (e.g., number, percentage) of users tend to access a first feature as soon as the software application is launched, a second feature after the software application has launched for some threshold period of time, and a third feature in rare circumstances. In this example, the tier-based ordering module 304 can assign a first load priority to a feature component corresponding to the first feature, a second load priority to a feature component corresponding to the second feature, and a third load priority to a feature component corresponding to the third feature. These feature components can then be categorized into a set of tiers based on their respective load priorities. For example, a first tier may be associated with a first priority, a second tier may be associated with a second priority, and a third tier may be associated with a third priority. In this example, the tier-based ordering module 304 can assign the feature component corresponding to the first feature to the first tier, the feature component corresponding to the second feature to the second tier, and the feature component corresponding to the third feature to the third tier. Naturally, many variations are possible.

The attribute-based ordering module 306 can be configured to determine a load order for feature components based on user attributes. For instance, the attribute-based ordering module 306 may determine that users that share a first set of attributes tend to access a first feature and a second feature in a software application within some threshold amount of time after the software application launches. Similarly, the attribute-based ordering module 306 may determine that users that share a second set of attributes tend to access a third feature and a fourth feature in the software application within the same threshold amount of time after the software application launches. In this example, the attribute-based ordering module 306 can customize the loading of feature components based on a user's attributes. In the foregoing example, a computing device of a user that satisfies the second set of attributes can be instructed to eager load feature components corresponding to the third feature and the fourth feature and to lazy load feature components corresponding to the first feature and the second feature. In general, any type of user attribute may be used to determine load order for feature components including, for example, gender, age, preferred language, a geographic region (e.g., city, zip code, state, country, etc.) associated with the user (e.g., geographic region in which the user is located or resides), and/or the user's device type, to name some examples.

The personalized ordering module 308 can be configured to determine a personalized load order for a given user. For example, the personalized ordering module 308 can determine which feature components of a software application are accessed by the user during execution of the software application and also when those feature components are accessed. For example, the personalized ordering module 308 may determine that the user tends to access a first feature and a second feature within a first threshold period of time after a software application launches. The personalized ordering module 308 may also determine that the user tends to access a third feature after a second threshold period of time since the software application was launched. Finally, the personalized ordering module 308 may determine that the user rarely accesses a fourth feature of the software application. In this example, the personalized ordering module 308 can determine that feature components corresponding to the first feature and the second feature should be loaded when the software application is launched, that a feature component corresponding to the third feature should be loaded after cold start is complete, and that a feature component corresponding to the fourth feature should only be launched when accessed by the user or when called.

In some embodiments, a machine learning model can be used to determine a load order (or load priority) for a feature component. The machine learning model can determine load order for feature components by which to prioritize loading of the feature components into memory. In some instances, the machine learning model can be trained based on various features and labels. The features can include, for example, attributes relating to a feature component, a computing environment in which the feature component is loaded, and a user associated with a computing device supporting the computing environment in which the feature component is loaded. The labels can provide an indication of load order for each feature component. Upon training the machine learning model, features relating to a feature component can be provided to the machine learning model to generate an indication of load order for the feature component.

FIG. 4A illustrates an example of a diagram 400, according to an embodiment of the present disclosure. The diagram 400 illustrates one approach for loading feature components. In this example, a custom class loader 402 is injected into a chain of class loaders that correspond to a software application 406. This chain of class loaders includes a class loader 404 that references the software application 406 (e.g., ApplicationClassLoader) and a default system class loader 408 that references various frameworks and/or libraries (e.g., SystemClassLoader). The custom class loader 402 can be used to load feature components (e.g., dex files) into memory. In this example, the custom class loader 402 can reference a list of feature components 410 (e.g., dex files). When a given feature is accessed during execution of the software application 406, the chain of class loaders can be traversed to identify a feature component that services that feature. In this example, the custom class loader 402 can identify the feature component (or dex file) from the list of feature components 410. This feature component can then be loaded (or executed).

FIG. 4B illustrates an example of an a diagram 430, according to an embodiment of the present disclosure. The diagram 430 illustrates another approach for loading feature components. In this example, individual custom class loaders 432 can be used to load (or execute) feature components (e.g., dex files). For example, each custom class loader 432 can reference a different feature component of the software application 406. In this example, a custom class loader 432 for a feature component can be used to execute code corresponding to the feature component without requiring this code to be installed with the software application 406. In some embodiments, a custom class loader can be implemented using DexClassLoader.

Figure 4C:
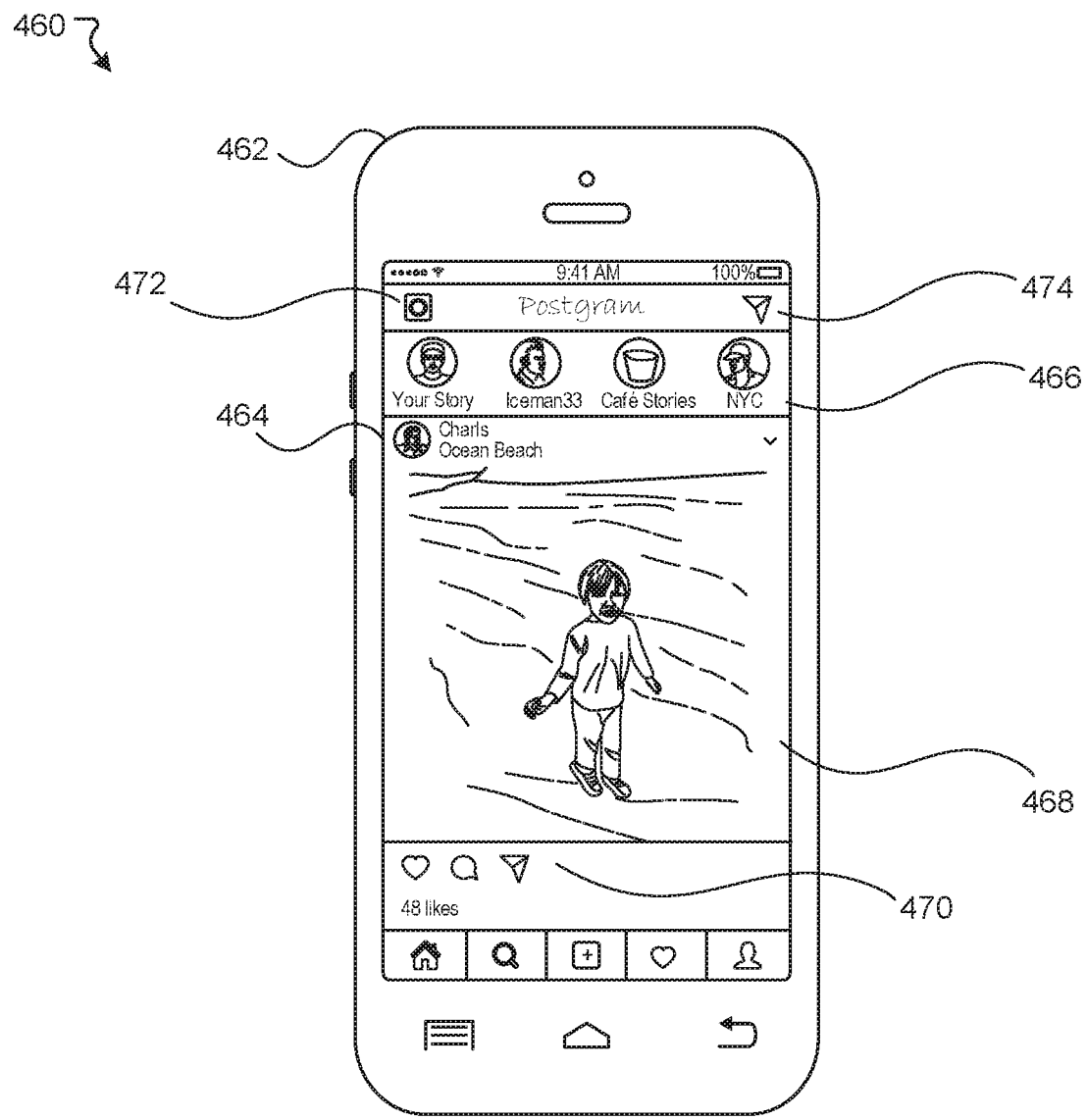

FIG. 4C illustrates an example 460 of an interface 464, according to an embodiment of the present disclosure. In this example, the interface 464 is presented through a display screen of a computing device 462. Further, the interface 464 may be provided through a software application (e.g., social networking application) running on the computing device 462 that is configured to interact with a social networking system. In the example of FIG. 4C, the interface 464 provides access to various stories through a first region 466 of the interface 464 and access to a content feed through a second region 468 of the interface 464. The software application includes a set of options 470 for interacting with content in the feed (e.g., like, comment, share, etc.). Further, the software application includes an option 472 for accessing a camera interface and an option 474 for accessing a messaging interface (e.g., instant messaging). In various embodiments, any of the features provided by the software application may be modularized into feature components that can be eager or lazy loaded. For example, software code corresponding to the camera interface, the messaging interface, and the content feed can be modularized into individual feature components that can be loaded separately from the software application, as illustrated in the example of FIG. 4D.

Figure 4D:
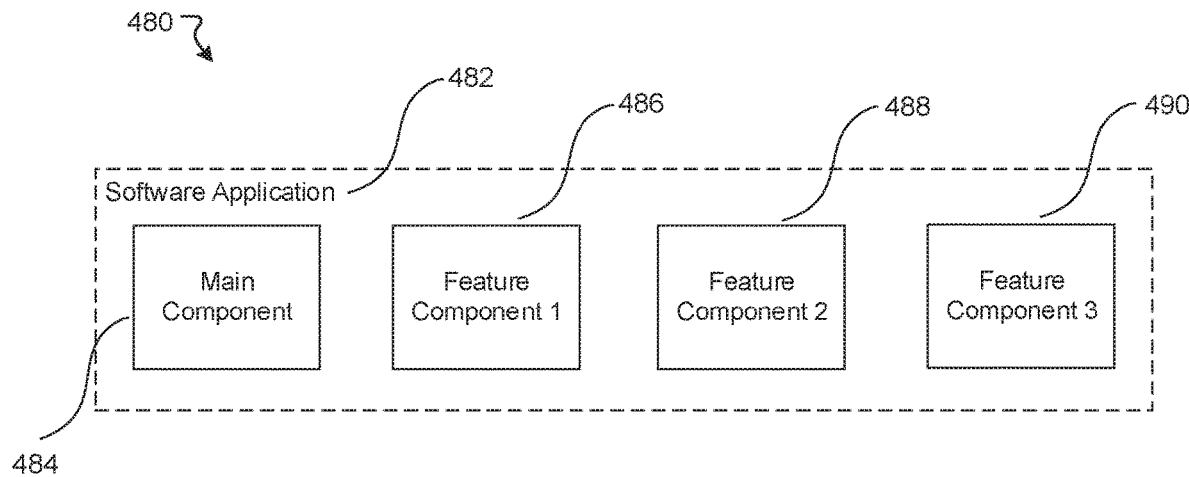
Figure 4E:
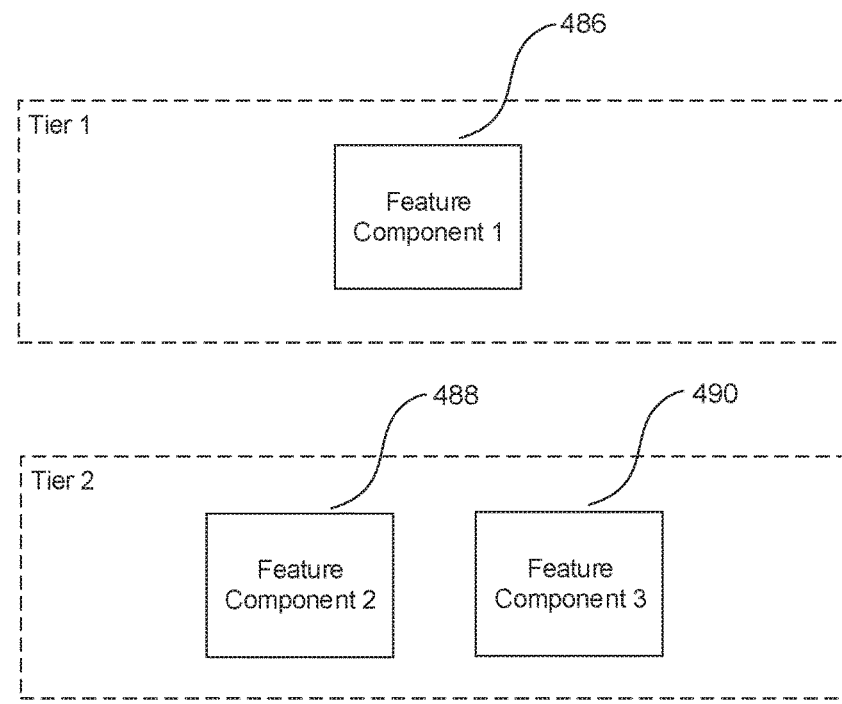

FIG. 4D illustrates an example 480 of a modularized software application 482. This software application 482 can include a main component 484 corresponding to the software application 482. In this example, various features of the software application have been modularized into a set of feature components. For example, a first feature component 486 may correspond to a camera interface feature provided by the software application, a second feature component 488 may correspond to a messaging interface provided by the software application, and a third feature component 490 may correspond to a content feed provided by the software application. These individual feature components may be eager or lazy loaded using any of the approaches described above. For example, in some embodiments, the feature components can be batched into a set of tiers, as illustrated in the example of FIG. 4E. In this example, the first feature component 486 is assigned to a first tier while the second feature component 488 and the third feature component 490 are assigned to a second tier. In various embodiments, the order and/or time at which a feature component is loaded can be determined based on a pre-defined load order and/or load time corresponding to the feature component's assigned tier.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a set of feature components corresponding to a software application can be determined. Each feature component corresponds to a modularized feature provided by the software application. At block 504, an order for loading the set of feature components upon execution of the software application can be determined. At block 506, the set of feature components can be loaded in memory based at least in part on the determined order.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
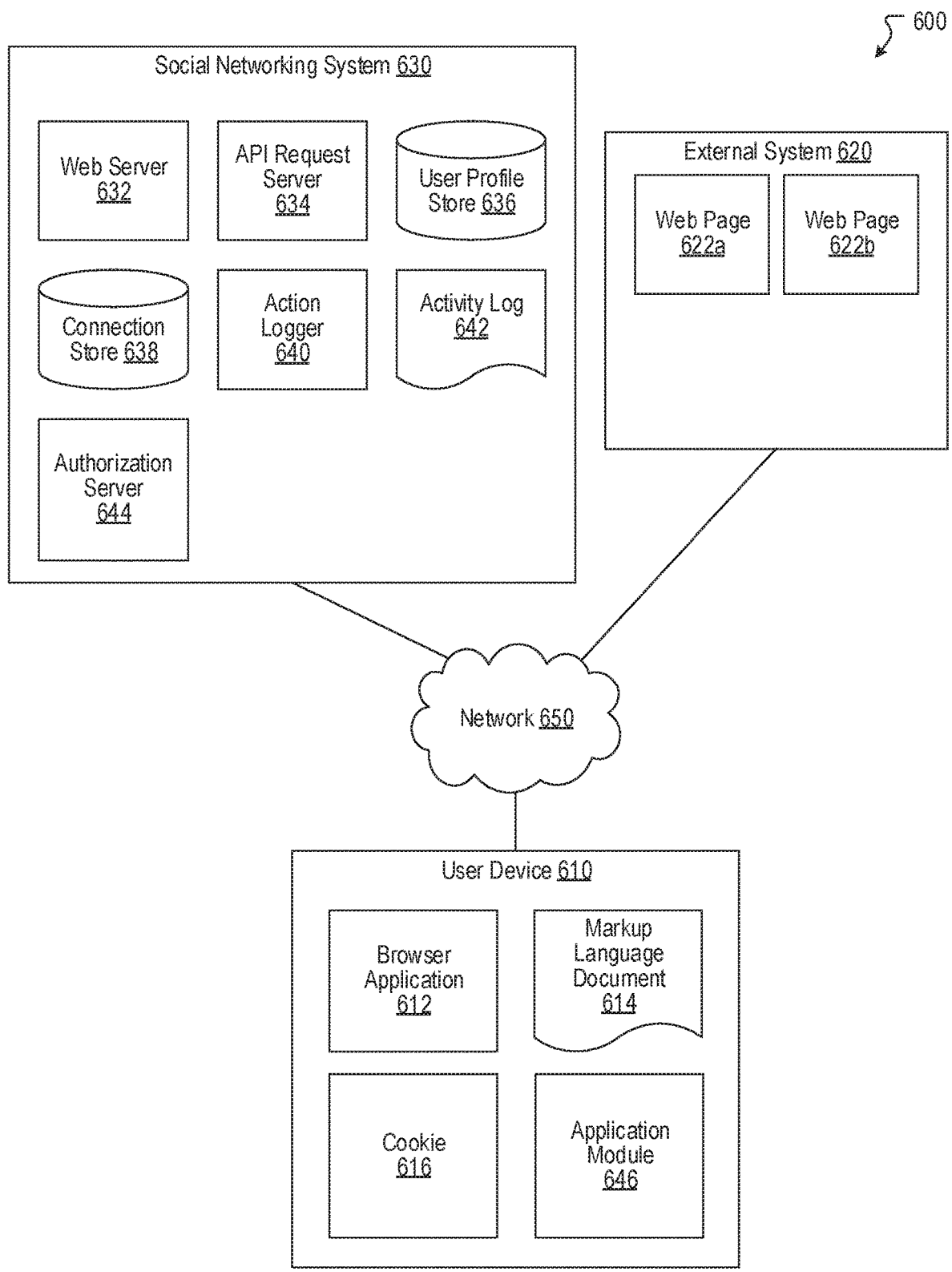
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, media items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and media items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include an application module 646. The application module 646 can, for example, be implemented as the application module 102 of FIG. 1. In some embodiments, the application module 646, in whole or in part, is also implemented in the social networking system 630. As discussed previously, it should be appreciated that there can be many variations or other possibilities.

Hardware Implementation

Figure 7:
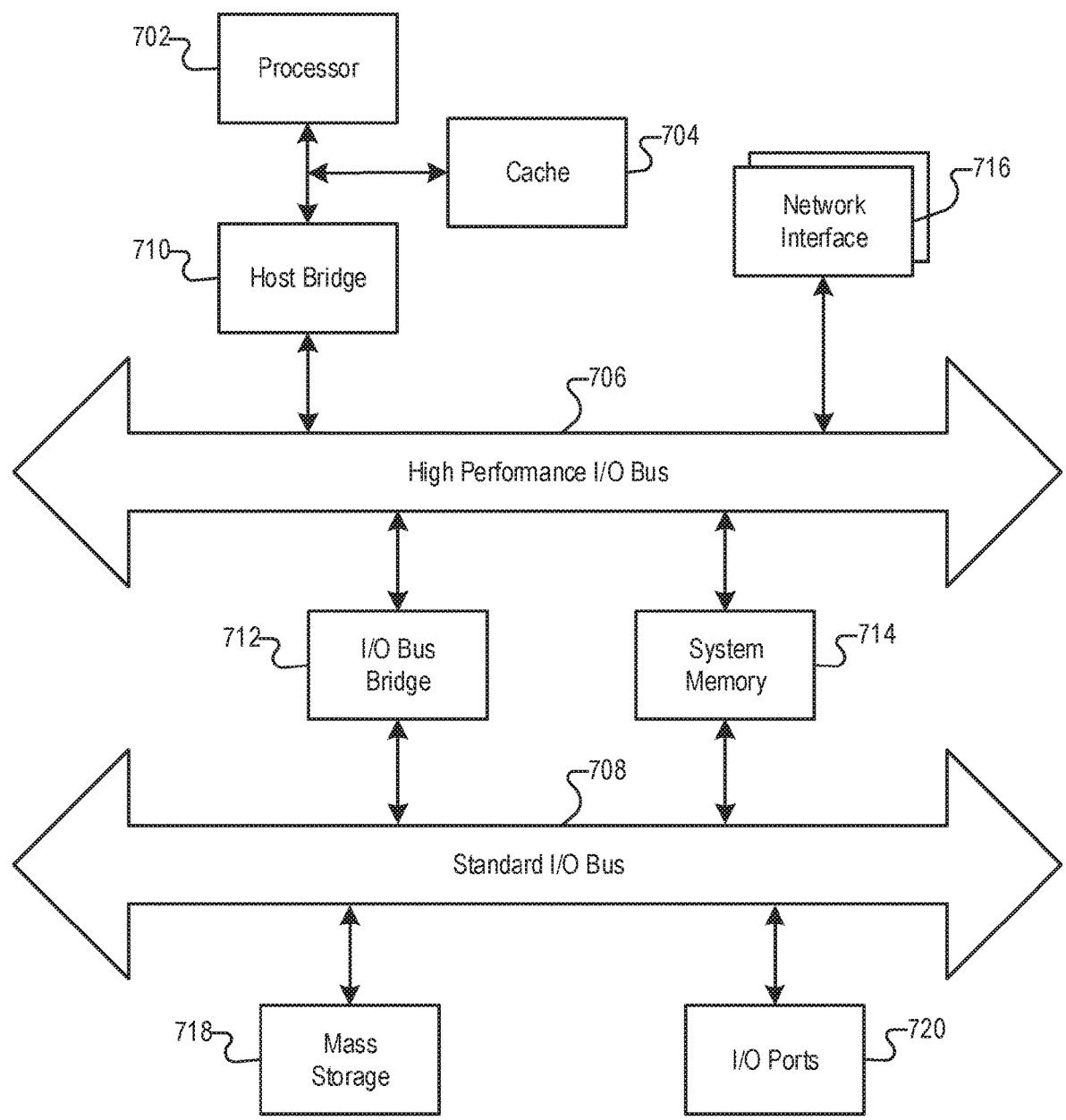
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing device, a set of feature components corresponding to a software application, wherein each feature component corresponds to a modularized feature provided by the software application;
    determining, by the computing device, an order for loading the set of feature components upon execution of the software application, wherein the determining further comprises:
        determining, by the computing device, the order for loading the set of feature components based at least in part on a machine learning model, wherein the machine learning model predicts a load priority for each feature component based on the feature component, a computing environment in which the feature component is loaded, and attributes of a user accessing the software application;
    assigning, by the computing device, each feature component to a tier in a set of tiers based on a load priority predicted for the feature component, wherein each tier is associated with a respective load time, the set of tiers including at least a first tier of components that are loaded when the software application is initially launched, a second tier of components that are loaded after the software application is fully launched, and a third tier of components that are loaded when accessed by the user; and
    causing, by the computing device, the set of feature components to be loaded in memory based at least in part on the respective load times associated with their assigned tiers.

2. The computer-implemented method of claim 1, wherein the load priority is determined based at least in part on historical user interaction data for a feature corresponding to the feature component.

3. The computer-implemented method of claim 1, wherein determining the order for loading the set of feature components further comprises:
    determining, by the computing device, a set of attributes describing a user operating the computing device; and
    assigning, by the computing device, a respective load order to each feature component based at least in part on the set of attributes.

4. The computer-implemented method of claim 1, wherein determining the order for loading the set of feature components further comprises:
    determining, by the computing device, a geographic region associated with a user operating the computing device; and
    assigning, by the computing device, a respective load order to each feature component based at least in part on the geographic region.

5. The computer-implemented method of claim 1, wherein determining the order for loading the set of feature components further comprises:
    determining, by the computing device, a personalized load order for a user operating the computing device, the personalized load order being determined based at least in part on the user's historical interaction with features provided by the software application.

6. The computer-implemented method of claim 1, wherein each feature component is associated with a corresponding custom class loader.

7. The computer-implemented method of claim 6, wherein the custom class loader is implemented using DexClassLoader.

8. The computer-implemented method of claim 1, wherein each feature component corresponds to a respective Dalvik Executable (dex) file.

9. A system comprising:
    at least one processor; and
    a memory storing instructions that, when executed by the at least one processor, cause the system to perform:
        determining a set of feature components corresponding to a software application, wherein each feature component corresponds to a modularized feature provided by the software application;
        determining an order for loading the set of feature components upon execution of the software application, wherein the determining further comprises:

determining the order for loading the set of feature components based at least in part on a machine learning model, wherein the machine learning model predicts a load priority for each feature component based on the feature component, a computing environment in which the feature component is loaded, and attributes of a user accessing the software application;

assigning each feature component to a tier in a set of tiers based on a load priority predicted for the feature component, wherein each tier is associated with a respective load time, the set of tiers including at least a first tier of components that are loaded when the software application is initially launched, a second tier of components that are loaded after the software application is fully launched, and a third tier of components that are loaded when accessed by the user; and causing the set of feature components to be loaded in memory based at least in part on the respective load times associated with their assigned tiers.

10. The system of claim 9, wherein the load priority is determined based at least in part on historical user interaction data for a feature corresponding to the feature component.

11. The system of claim 9, wherein determining the order for loading the set of feature components further causes the system to perform:

determining a set of attributes describing a user operating the computing device; and assigning a respective load order to each feature component based at least in part on the set of attributes.

12. A non-transitory computer-readable storage medium including instructions that, when executed by at least one processor of a computing system, cause the computing system to perform a method comprising:

determining a set of feature components corresponding to a software application, wherein each feature component corresponds to a modularized feature provided by the software application;

determining an order for loading the set of feature components upon execution of the software application, wherein the determining further comprises:

determining the order for loading the set of feature components based at least in part on a machine learning model, wherein the machine learning model predicts a load priority for each feature component based on the feature component, a computing environment in which the feature component is loaded, and attributes of a user accessing the software application;

assigning each feature component to a tier in a set of tiers based on a load priority predicted for the feature component, wherein each tier is associated with a respective load time, the set of tiers including at least a first tier of components that are loaded when the software application is initially launched, a second tier of components that are loaded after the software application is fully launched, and a third tier of components that are loaded when accessed by the user; and causing the set of feature components to be loaded in memory based at least in part on the respective load times associated with their assigned tiers.

13. The non-transitory computer-readable storage medium of claim 12 wherein the load priority is determined based at least in part on historical user interaction data for a feature corresponding to the feature component.

14. The non-transitory computer-readable storage medium of claim 12, wherein determining the order for loading the set of feature components further causes the computing system to perform:

determining a set of attributes describing a user operating the computing device; and assigning a respective load order to each feature component based at least in part on the set of attributes.

* * * * *